March 10, 1964

O. A. WRIGHT 3,124,365

SHAFT SEAL WITH AXIALLY ENGAGING FACES AND
SHAFT-SUPPORTED, AXIALLY SLIDABLE
SEAL ELEMENT

Filed June 23, 1961

INVENTOR.
OSWALD A. WRIGHT
BY
Lyon & Lyon
ATTORNEYS

United States Patent Office 3,124,365
Patented Mar. 10, 1964

3,124,365
SHAFT SEAL WITH AXIALLY ENGAGING FACES AND SHAFT-SUPPORTED, AXIALLY SLIDABLE SEAL ELEMENT
Oswald A. Wright, 516 Calle Mayor, Redondo Beach, Calif.
Filed June 23, 1961, Ser. No. 119,174
2 Claims. (Cl. 277—86)

This invention relates to shaft sealing structure, and included in the objects of this invention are:

First, to provide a shaft sealing structure utilizing a mechanical seal having confronting and mating, rotating and nonrotating, faces to seal a shaft with respect to a housing, and novel means for ensuring a positive pressure of one face against the mating face, whether the shaft be idle or turning and whether the pressure in the housing be above or below atmospheric pressure.

Second, to provide a shaft sealing structure wherein the fluid which affords the sealing pressure is supplied from the radially inner, as distinguished from the radially outer, side of the sealing means.

Third, to provide a shaft sealing structure wherein the effective pressure area for a selected installation may be predesigned to meet the conditions of operation; that is, irrespective of the pressures which need be contained, the bearing force between the mating, sealing elements may be predesigned to meet optimum operating conditions.

With the above and other objects in view, as may appear hereinafter, reference is directed to the accompanying drawings in which.

Figure 1:
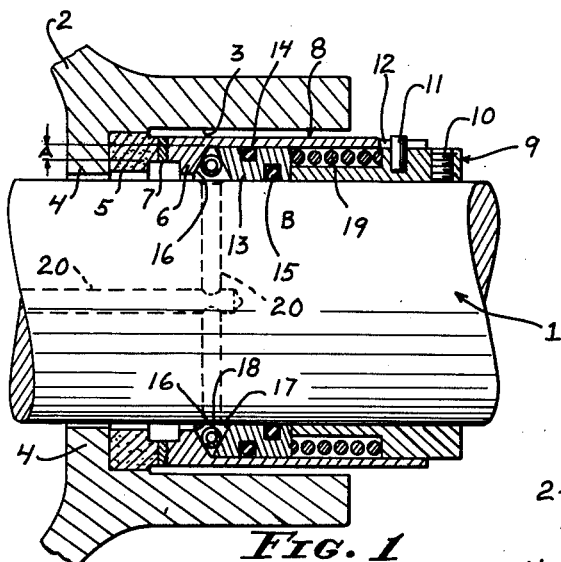
FIGURE 1 is a fragmentary view of a shaft extending from a housing, shown fragmentarily and in section, and illustrating one form of the shaft sealing structure.

Reference is first directed to FIGURE 1. The shaft sealing structure herein illustrated is adapted to surround a shaft 1, which protrudes from a housing 2 through a counterbore 3 having a radially internal flange 4 at its axially inner end.

Press fitted in the counterbore 3, adjacent the flange 4, is a fixed seal ring 5. Surrounding the shaft 1 and rotatable within the counterbore 3 is a rotatable seal ring 6. The axially inner end of the rotatable seal ring 6 is provided with a wear ring 7 which is welded or brazed thereto and formed of suitable wear-resistant metal. The wear ring 7 forms an annular sealing face which engages and mates a sealing face formed at the axially outer end of the fixed seal ring 5.

Attached or formed as an integral part of the rotatable seal ring 6 is a sleeve 8 having an internal diameter greater than the internal diameter of the mating sealing faces of the fixed and rotatable rings 5 and 6. The difference in these diameters is precalculated to provide an annular pressure area indicated by A in FIGURE 1. As will be brought out hereinafter, fluid pressure exerted against this area holds the seal rings in cooperative sealing relation.

Fitted on the shaft 1 outwardly from the housing 2 is a collar 9 which is secured to the shaft 1 by one or more set screws 10. The collar 9 is provided with one or more radiating pins 11 which ride in axially directed slots 12 at the outer end of the sleeve 8, opposite from the rotatable seal ring 6. The collar 9, pins 11, and slot means 12 together with the sleeve 8 provide a drive connection between the shaft 1 and the rotatable seal ring 6 so that the ring 6 rotates with the shaft.

Interposed between the rotatable seal ring 6 and the collar 9 is a seal collar 13 having radially outer and radially inner O-rings 14 and 15 which sealingly engage the sleeve 8 and shaft 1, respectively. The axially inner end of the seal collar 13 and the axially outer end of the rotatable seal ring 6 define confronting outwardly converging shoulders 16 and 17 which form an annular V-shaped cavity or pressure chamber.

A spring 18 wound in toroid form is fitted between the shoulders 16 and 17 and tends to spread the seal ring 6 and seal collar 13 from each other so that the seal collar 13 normally abuts the axially inner end of the collar 9. A portion of the length of the collar 9 is relieved to provide space for a coil spring 19, which bears against the axially outer end of the seal collar 13 in opposition to the toroid spring 18.

The seal rings 5 and 6 axially inward from the pressure chamber may clear the shaft 1 substantially, so that fluid under pressure from within the housing 2 may enter the pressure chamber so as to force the seal collar 13 against the collar 9 and to exert pressure on the area A. In addition, or alternatively, the shaft 1 may be provided with passages 20 which communicate with a pressure source to direct pressure fluid into the pressure chamber.

The passages 20 may also be used to maintain circulation of a pressure fluid to cool the seal, particularly in the region of the seal faces.

Operation of the shaft sealing structure shown in FIGURE 1 is as follows:

Under ideal conditions in which the pressure in the housing 2 is equal to atmospheric pressure, the coil spring 19 acts through the seal collar 13 and toroid spring 18 to urge the rotatable seal ring 6 into sealing engagement with the fixed seal ring 5.

If under operating conditions there exists a positive pressure within the housing 2 or a positive pressure is supplied through the shaft passages 20, the pressure chamber is filled with pressure fluid which exerts a force on the area A calculated to maintain a sealing connection bteween the seal rings 5 and 6.

If under the conditions of operation or under transient conditions a negative pressure should exist within the housing 2, the negative pressure acts against the area B corresponding to the axially outer end of the seal collar 13 and through the toroid spring 18 against the rotatable seal ring 6 to maintain a sealing condition. This force is augmented by the spring 19.

Figure 2:
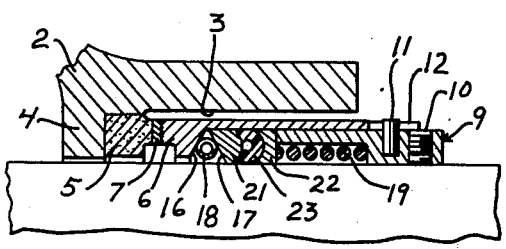
FIGURE 2 is a fragmentary, partial sectional, partial elevational view similar to FIGURE 1, but showing only a portion of a shaft, and illustrating a modified form of the shaft sealing structure.

Reference is now directed to FIGURE 2. The construction here illustrated is essentially the same as the previously described structure except that in place of the seal collar 13, two metal rings 21 and 22 are provided, and interposed between these rings is a seal cup 23 of U-shaped cross section.

The axially inner ring 21 is provided with a sloping shoulder in the manner of the seal collar 13. The axially outer ring 22 bears against the collar 9 for engagement by the coil spring 19. In this construction the collar 9 is internally relieved to receive the coil spring 19. However, the effect is identical to that shown in FIGURE 1.

Figure 3:
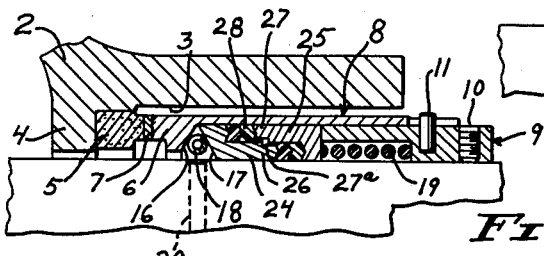
FIGURE 3 is a similar fragmentary, sectional view showing another form of the shaft sealing structure.

Reference is now directed to the construction shown in FIGURE 3. In the construction here illustrated, the seal collar 13 is replaced by two seal rings 24 and 25 having axially overlapping lips 26 and 27 and interlocked by a key ring 27a. The distal ends are radially enlarged ends so as to provide space for packing 28, preferably in the form of chevron packing. The axially inner end of the ring 24 is provided with a sloping shoulder 17 and the axially outer ring 25 bears against the collar 9.

Operation of the construction shown in FIGURES 2 and 3 is the same as that of the first described structure.

Figure 4:
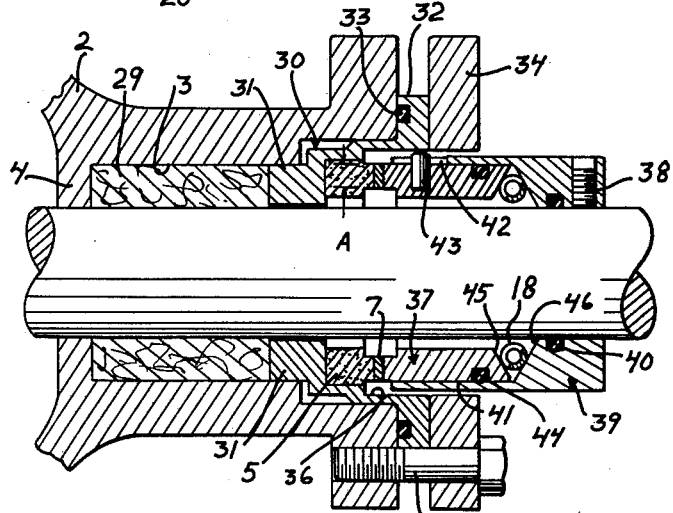
FIGURE 4 is a fragmentary, sectional view with the shaft shown in elevation similar to FIGURE 1, showing a further modification of the shaft sealing structure.

Reference is now directed to FIGURE 4. The construction here illustrated is an adaptation of the shaft sealing structure as an auxiliary seal placed outwardly of a standard packing gland.

For purposes of illustration, the counterbore 3 of the housing 2 is shown as filled with conventional packing 29 held in place by a packing gland ring 30, having at its axially inner end an internal flange 31 which engages the packing. The axially outer end of the packing gland ring 30 is provided with an external flange 32 and seal ring 33, and is held in sealing engagement with the outer end of the housing 2 by means of a retainer ring 34 and bolts 35.

The packing gland ring 30 is provided with a counterbore 36 corresponding to the counterbore 3 of the housing 2, and may be adapted to receive any of the previously described shaft sealing structures. However, a modified shaft sealing structure is illustrated.

The modified structure includes a fixed seal ring 5 which is engaged by a rotatable seal ring 37, having at its axially inner end a wear ring 7 as in the first described structure. Secured to the shaft 1 by one or more set screws 38, axially outwardly of the rotatable seal ring 37, is a collar 39 which forms a seal connection with the shaft 1 by means of an O-ring 40.

The collar 39 is provided with a sleeve 41 which fits over the rotatable seal ring 37 and is connected thereto by one or more slots 42 which receive pins 43 extending radially from the seal ring 37. An O-ring 44 is interposed between the sleeve 41 and the seal ring 37. The axially outer end of the seal ring 37 and the confronting axially inner end of the collar 39 form radially outwardly converging shoulders 45 and 46, which define therebetween a pressure chamber in which is fitted a toroid spring 18 as in the previously described structures.

As in the previously described structure, the radially inner diameter of the sleeve 41 is greater than the radially inner diameter of the sealing faces between the seal rings so that a pressure area A is established at the axially outer end of the seal ring 37, this pressure being effective when pressure fluid exists in the pressure chamber to urge the rotatable seal ring 37 against the fixed seal ring 5.

In the event the pressures internally and externally of the housing 2 are equal, the toroid spring 18 exerts a force tending to hold the seal ring 37 in its sealing position. This construction does not, however, provide for a condition of negative pressure within the housing 2.

It will be observed that, under conditions of positive pressure within the seal, any material worn from the mating seal faces is moved out of the seal and does not remain within the seal to contaminate the material (such as food products) handled by the pump or other apparatus with which the seal is utilized.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. Means for effecting a seal between a rotatable shaft and a surrounding housing, comprising: mating, fixed, and rotatable sealing rings surrounding said shaft and having mutually engageable annular sealing faces, said fixed sealing ring secured to said housing; a tubular sleeve extending from said rotatable sealing ring; a collar secured to said shaft; means connecting said collar and sleeve to secure said sleeve to said collar for rotation with said shaft and permit limited axial movement of said sleeve and said rotatable sealing ring; said sleeve forming with said shaft an annular sealing chamber of greater diameter than the internal diameter of said sealing faces; a sealing unit axially slidable in said chamber and including seal means forming a sealing connection with said sleeve and also with said shaft, and dividing said chamber into an inner and an outer chamber; said inner chamber being subject to pressures internally of said sealing faces to urge the rotatable sealing face against the fixed sealing face, said outer chamber being exposed to ambient pressures externally of said sealing faces to urge the rotating sealing face against the fixed sealing face, when the external pressure exceeds the pressure internally of said sealing faces.

2. A seal as set forth in claim 1, wherein: springs are disposed in both of said inner and outer chambers and exert opposed forces on said sealing unit.

References Cited in the file of this patent

UNITED STATES PATENTS

| | | |
|---|---|---|
| 1,926,007 | Kohler | Sept. 5, 1933 |
| 2,650,842 | Coopman | Sept. 1, 1953 |
| 2,895,758 | Wright | July 21, 1959 |
| 3,015,506 | Tracy | Jan. 2, 1962 |
| 3,026,112 | Mayer | Mar. 20, 1962 |